(12) United States Patent
Joaquim

(10) Patent No.: US 6,257,167 B1
(45) Date of Patent: Jul. 10, 2001

(54) COMBINATION BOAT TRAILER AND LIFT

(76) Inventor: A. Thomas Joaquim, 10 Dale St., Fall River, MA (US) 02721

( * ) Notice: Subject to any disclaimer, the term of this patent is extended or adjusted under 35 U.S.C. 154(b) by 0 days.

(21) Appl. No.: 09/553,444

(22) Filed: Apr. 19, 2000

Related U.S. Application Data

(60) Provisional application No. 60/130,034, filed on Apr. 19, 1999.

(51) Int. Cl.$^7$ ........................................... B60P 3/10
(52) U.S. Cl. .................. 114/344; 280/414.1; 414/678
(58) Field of Search .................. 114/44, 48, 45, 114/51, 344; 414/482, 483, 484, 556, 678; 280/414.1

(56) References Cited

U.S. PATENT DOCUMENTS

| | | | |
|---|---|---|---|
| 5,380,143 | * | 1/1995 | Mohan .................................. 414/678 |
| 5,468,115 | * | 11/1995 | Alvis ..................................... 414/556 |
| 5,772,388 | * | 6/1998 | Clark ..................................... 414/484 |

* cited by examiner

*Primary Examiner*—Jesus D. Sotelo
(74) *Attorney, Agent, or Firm*—Louis J. Franco

(57) ABSTRACT

A combination boat trailer and lift includes an elongated base frame with forward and rear ends, a hitch assembly and an axle and wheel assembly to facilitate towing behind an automobile over land. An elongated, collapsible upper frame having front and back ends is cooperatively coupled to the base frame through a plurality of spaced apart elongated coupling arms, each arm of which is pivotally attached at one end to the base frame and at its other end to the upper frame. The upper frame is longitudinally and vertically displaceable with respect to the base frame in a pivotal mode on the coupling arms between an extreme lowered position and an extreme raised position such that the rearwardmost displacement of the upper frame corresponds to the extreme lowered position and forward movement of the upper frame from its extreme lowered position moves the upper frame toward its extreme raised position. A winch and cable system draws the upper frame at least toward its extreme raised position. To support the base frame above the floor of a body of water, a plurality of adjustable support legs extends downwardly from the base frame.

17 Claims, 4 Drawing Sheets

COMBINATION BOAT TRAILER AND LIFT

PRIORITY BASED ON PREVIOUSLY FILED PROVISIONAL

Priority based on provisional patent application Ser. No. 60/130,034 filed Apr. 19, 1999 entitled, "Combination Boat Trailer and Lift for Partial, Seasonal Submersion in a Body of Water" is claimed.

FIELD

This invention relates generally to a combination boat trailer and lift, and more particularly to a combination boat trailer and lift adapted for partial submersion in a body of water during the season of use of a boat to be lifted out of and lowered into the body of water thereby.

BACKGROUND

Boat trailers for transporting boats over land from one location to another behind a towing vehicle are well known in the art. Most commonly, such trailers are backed down a launching ramp into a body of water into which a boat is to be launched or from which a boat is to be pulled out of the water and onto the trailer by a manual or electrical winch. Once a boat has be launched from a trailer into a body of water, the trailer must be towed away and stored on land until needed again to remove the boat from the water. Frequently, a boat is launched once at the beginning of a boating season and remains in the water for the entire season before being pulled out of the water on the boat trailer to be stored on land in the off-season. As such, many boat trailers remain idle on land during the boating season where they take up space undesirably.

While many boats remain submerged to their waterlines in slips or at moorings for the duration of the boating season, it is common for boat owners to dock and store their boats on boat lifts which raise them above the water in order to maintain the cleanliness of their hulls and to prevent damage from waves. When it is desired to use the boat, it is lowered on the boat lift into the water to a point where it can float free of the boat lift. At the end of a boating season, the boat is pulled out of the water and stored on its trailer and the boat lift is removed from the water and stored on land as well.

Accordingly, one must typically incur the expense of owning both a boat trailer and a boat lift and have sufficient space to store both or else incur additional expense to rent storage space for one or both of the trailer and the lift. Added to the expense of owning and storing a trailer and a lift is the difficulty in removing the typical boat lift from the body of water, as well as positioning the boat lift at a suitable docking location. Often both operations require the cooperative efforts of several individuals. Furthermore, most boat lifts do not float, nor can they be maneuvered in a floatable manner in order to facilitate the process of positioning the boat lift in a suitable docking location.

At least one attempt at eliminating the difficulties identified above has been made and is the subject of U.S. Pat. No. 5,380,143 issued to Mohan on Jan. 10, 1995. Mohan discloses a lightweight combination boat trailer and lift which can transport a boat over land and elevate the boat above a body of water for docking and storage. Furthermore, the Mohan device is capable of being maneuvered about the body of water in a floatable manner to facilitate its being positioned in a suitable docking location for the duration of the boating season. However, while the Mohan device represents an improvement over the prior alternative of owning and storing a separate trailer and lift, each of the two preferred embodiments through which Mohan teaches his invention has particular limitations and disadvantages.

In a first preferred embodiment, Mohan teaches a lightweight combination boat trailer and lift including a lightweight support frame, at least three adjustable support legs adjustably secured to the support frame and a cable and winch assembly secured to the support frame and the support legs for elevating the support frame above the body of water. Among the disadvantages of this first embodiment are its very elaborate cable and winch system for simultaneously moving the adjustable support legs in the same direction and the fact that when the support frame and boat are elevated on the support legs, the center of mass of the trailer and boat is high above the floor of the body of water and there is nothing to stabilize the support legs such that their lower ends will not move with respect to one another to prevent bending or possible collapse thereof in high winds and/or turbulent water.

Although the second preferred embodiment of the Mohan device has a much simpler cable and winch system and appears to provide a much more stable footing on the floor of the body of water than the first embodiment, the second embodiment has at least one notable disadvantage of its own: the footing of the three adjustable support legs is not firmly fixed on the floor of the body of water. Specifically, on each occasion on which the boat is lowered or elevated, the entire combination boat trailer and lift of Mohan's second embodiment must move with respect to the floor of the body of water. It will be appreciated that the entire combination in this embodiment may "crawl" unpredictably along the floor of the body of water absent some external means of anchoring it in place.

SUMMARY

Various embodiments and versions of the invention may include one or more of the following features.

In one embodiment, a combination boat trailer and lift comprises an elongated base frame having forward and rear ends and elongated left and right side frame members. An elongated, collapsible upper frame having front and back ends and left and right beams is cooperatively coupled to the base frame by a plurality (i.e., two or more) of spaced apart, collapsible coupling arms, each coupling arm pivotally connected at opposite first and second ends thereof to the base frame and upper frame to define a parallelogram configuration. In this way, the upper frame is longitudinally and vertically displaceable with respect to the base frame in a pivotal mode on the collapsible coupling arms.

To raise and lower the upper frame on the base frame, a winch and cable assembly is secured toward the forward end of the base frame. A hook member at one end of the cable is selectively coupleable to a hookable element on the upper frame, one or more of the coupling arms or a cross member secured between a pair of transversely spaced coupling arms. The upper frame moves longitudinally and vertically such that rearward longitudinal motion moves it toward its extreme lowered position and forward longitudinal motion moves it toward its extreme raised position. As such, when the cable is wound onto the winch, the upper frame is pulled forward longitudinally and, consequently, raises vertically. Optionally, one or more arm stops may be provided to prevent the coupling arms from attaining perpendicularity with the base frame; in this way, gravity may be relied upon to return the upper frame to its extreme lowered position when the cable is permitted to unwind from the winch. The arm stop(s) may be attached to the base frame, one or more of the coupling arms and/or the upper frame. An arm stop may take the form of a length of chain or cable secured at either end between the upper frame and the base frame or either the upper frame or the lower frame and one or more coupling arms, for example.

The base frame includes a hitch assembly at its forward end and is secured to an axle and wheel assembly to enable it to be coupled to a hitch on a towing vehicle and towed thereby over land. Preferably the axle and wheel assembly is removable so that it need not remain submerged in water for the duration of the boating season as discussed further in this specification. In addition, or as an alternative to being removable, the axle and wheel assembly may be waterproof to prevent damage from submersion.

Further secured to the base frame is a plurality of downwardly extending support legs for supporting the base frame above the floor of a body of water, each leg being adjustable to facilitate changes in the distance to which it extends downwardly from the base frame.

In one embodiment, each support leg is adjustable and selectively securable into different positions independently of the other legs so that the base frame may be supported substantially level over uneven or irregular terrain. Each support leg may include a foot to distribute the load it bears over a larger area. In one version, each of a plurality of jack stands comprises a downwardly extending, elongated support leg which is adjustably received and selectively securable by a brace fastened to the base frame. Although one embodiment described further in the detailed description calls for a set screw to maintain each support leg in a desired position, the jack stands may be of numerous configurations. For example, the support leg of each may be provided with a series of longitudinally spaced, annular ridges between which the set screw may be tightened to prevent the slipping of the support leg within its brace. Alternatively, holes or recesses in the support leg may receive the set screw, a pin, or a bolt. Another alternative would be to include on each support leg a toothed surface to be engaged by a pawl in the brace in which it is received. The pawl could be moved incrementally through each tooth to jack the base frame up in one direction and reversed to lower it by means of a jacking handle. Similar devices are well known in connection with automobile tire-changing jacks, for example, and need not be further described for the benefit of those of ordinary skill in the art.

The invention may provide one or more of the following advantages.

An advantage of the combination boat trailer and lift described herein is that it can be used to transport a boat over land behind a towing vehicle, elevate a boat above the surface of a body of water for docking and storage, and be floatably maneuvered through the body of water for positioning in a suitable docking location.

Another advantage of the present combination boat trailer and lift is that it requires only a relatively simple winch and cable assembly to elevate and lower a boat above and into a body of water respectively.

A further advantage is the invention is that it is stable under windy and rough water conditions when the center of mass of the apparatus and boat combination is at its highest.

It is still a further advantage of the combination boat trailer and lift that, when positioned at a suitable docking location for the boating season, it remains firmly footed on the floor of the body of water in which it is at least partially submerged, even when a boat is lowered or raised into or out of the water thereby.

DETAILED DESCRIPTION

Figure 1:
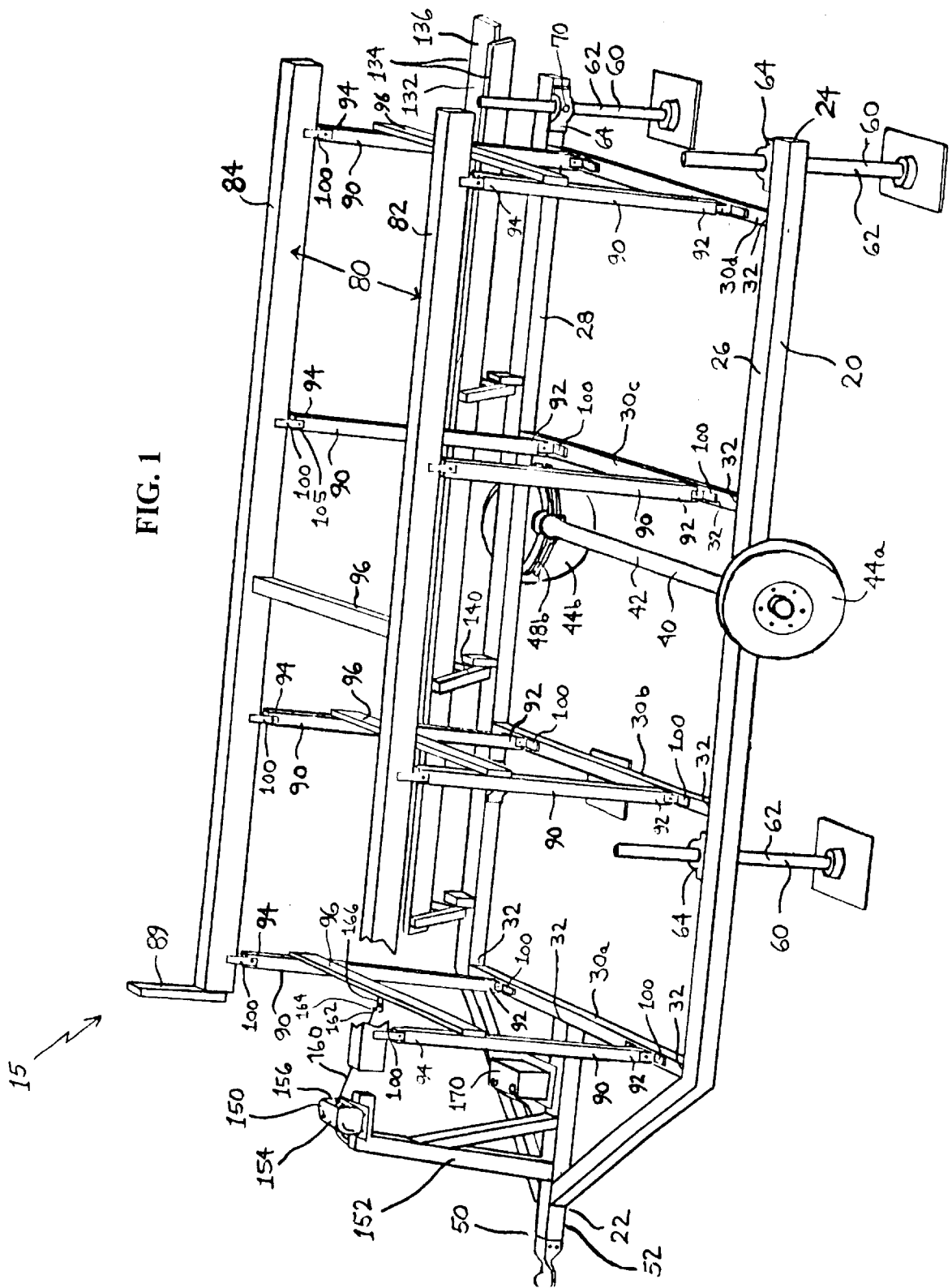
FIG. 1 is a rear left side view of a combination boat trailer and lift with the upper frame in it extreme raised position.

The following description of a combination boat trailer and lift is demonstrative in nature and is not intended to limit the invention or its application of uses. Furthermore, the combination boat trailer and lift is described primarily in the context of transporting and lifting a pontoon boat; however, it will be appreciated that the invention as defined in the appended claims is not limited to exclusive use with pontoon boats and that it may be adapted for use with other types of boats, including V-type hulled boats, and personal watercraft, for example.

Referring to FIGS. 1–4, there is shown a combination boat trailer and lift 15 which is adapted specifically for the trailering, lifting and lowering of a pontoon boat 200 and/or catamaran including a generally planar, rectangular deck 210 and left and right side floatation members 222 and 224 affixed one each to the underside of the deck 210 at or near left and right side edges of the deck 210. The combination boat trailer and lift 15 includes an elongated base frame 20 having a forward end 22, a rear end 24 and elongated left and right side frame members 26 and 28 extending longitudinally between the forward and rear ends 22 and 24. The elongated left and right side frame members 26 and 28 are joined to one another through transverse frame members 30*a*, 30*b*, 30*c*, and 30*d* extending between the left and right side frame members 26 and 28 and secured thereto preferably by welded seams 32.

To enable the combination boat trailer and lift 15 to be transported over land behind a towing vehicle (not shown), an axle and wheel assembly 40 is secured to the base frame 20 and a hitch assembly 50 is secured to the forward end 22 of the base frame 20. The axle and wheel assembly 40 is preferably a waterproof assembly of the general type well known to the boat trailer industry, and comprises at least one axle 42 and at least one each of a left tire and wheel 44*a* and a right tire and wheel 44*b* bolted to left and right side hubs 46*a* and 46*b* (46*a* not shown in FIG. 1). The axle 42 is furthermore preferably mounted on left and right side leaf spring assemblies 48*a* and 48*b* to provide suspension as is known.

The hitch assembly 50 includes a tongue 52 which is secured to the forward end 22 of the base frame 20 and extends in the direction of the longitudinal axis thereof. Fastened by bolts, welded seams, or the like to the tongue 52 is a ball-socket member 54 of the type commonly used to receive a hitch ball member (not shown) on a vehicle hitch (not shown).

To raise and support the base frame 20 above the floor of a body of water at a desired and appropriate height—or above the ground if such is desired—adjustable jack stands 60 are secured to the base frame 20. Preferably, the jack stands 60 are adjustable manually and independently of one another so that the base frame 20 may be stably leveled on uneven terrain such as that which is commonly encountered at shorelines. Each jack stand 60 comprises a downwardly extending, elongated support leg 62 which is adjustably secured by a brace 64 fastened to the base frame 20, preferably to one of the left and right side frame members 26 and 28 or one of the transverse frame members 30a,b,c and d. In some embodiments, depending on particular parameters such as the width of the base frame 20 and length of the elongated support legs 62, it may be necessary or desirable to fasten the jack stands 60 to one or more of the transverse frame members 30a,b,c and d instead of the left and right side frame members 26 and 28 to avoid interference with the left and right side pontoon cradles 130 and 132 that are introduced and discussed in some detail later in this description. Each support leg 62 may be provided with a removable or permanent foot 68 as shown. Furthermore, each foot 68 may be pivotally secured to the support leg 62 from which it depends. To hold each support leg 62 in place in its desired position, each brace 64 has a threaded hole therethrough which threadably receives a set screw 70 therein for alternate engagement and disengagement with the support leg 62 to facilitate adjustment in the distance to which the support leg 62 extends below the base frame 20.

Figure 2:
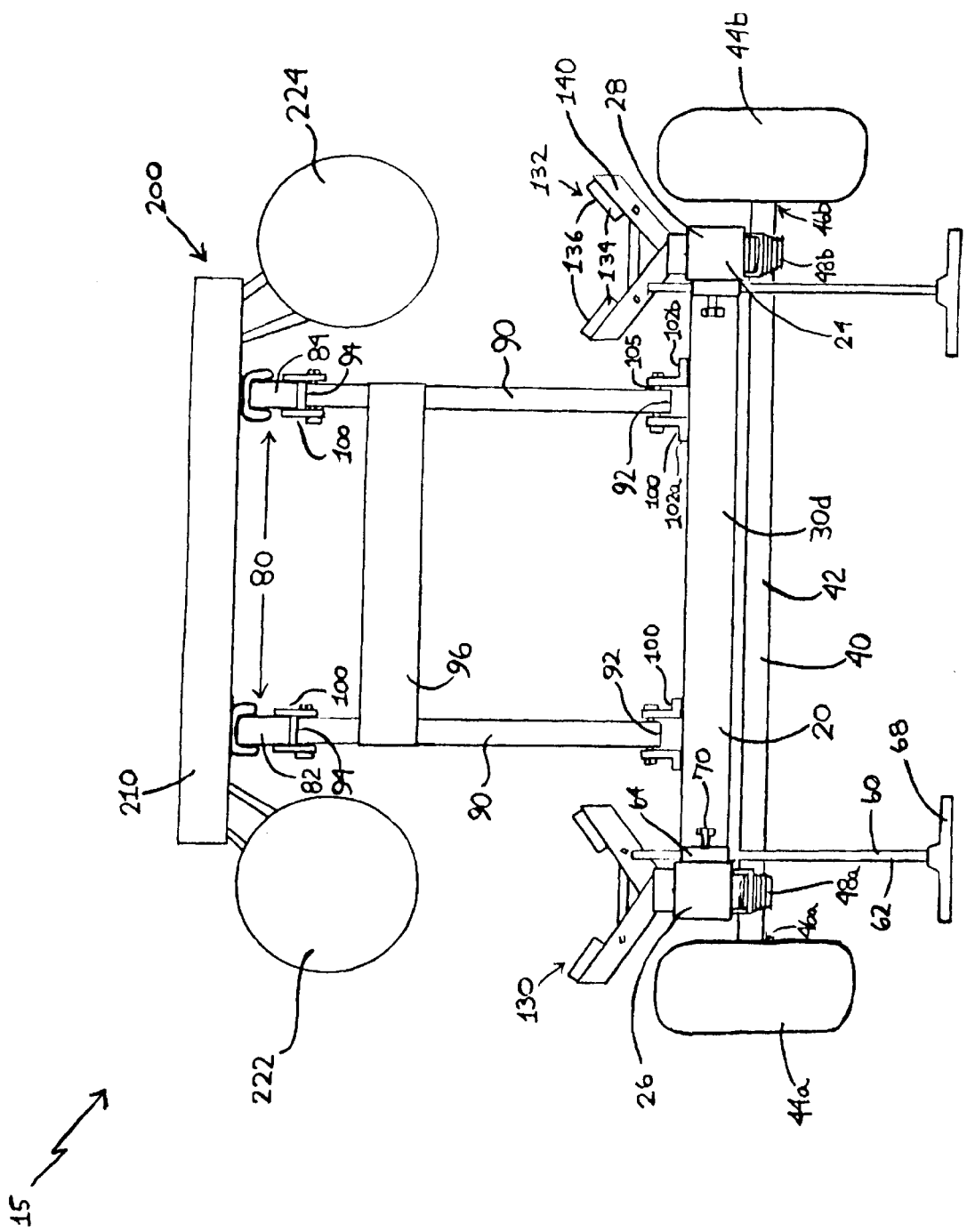
FIG. 2 is a rear view of the embodiment depicted in FIG. 1 with the upper frame in its extreme raised position.
Figure 3:
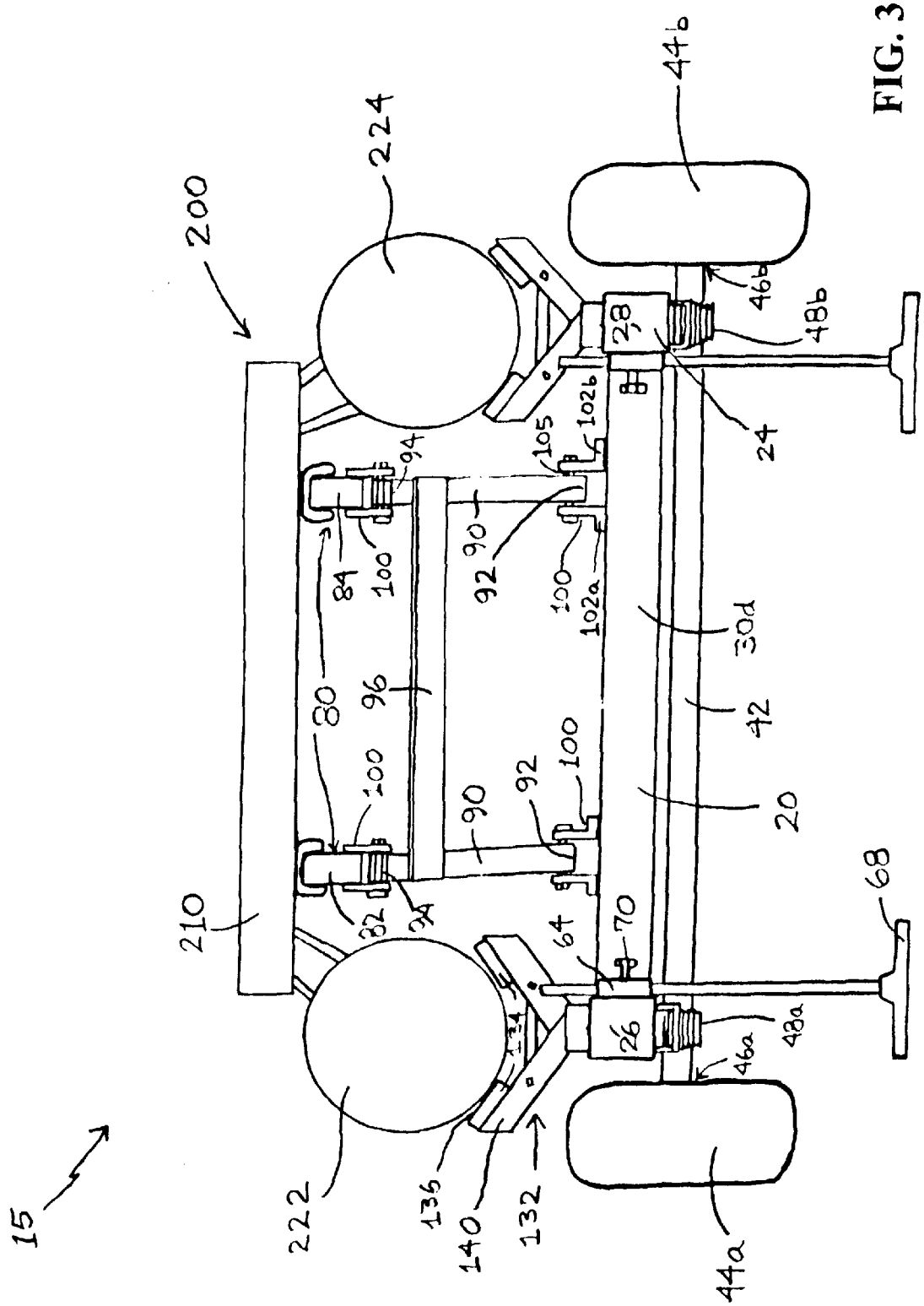
FIG. 3 is a rear view of the embodiment depicted in FIG. 1 with the upper frame in its extreme lowered position.

Movably secured to the base frame 20 is a collapsible upper frame 80 that is vertically displaceable with respect to the base frame 20 between extreme lowered and extreme raised positions for alternately lowering a pontoon boat or catamaran, for example, into a body of water and elevating the boat above the surface of the body of water. In the specific embodiment shown in FIGS. 1–3, the upper frame 80 comprises an elongated left side beam 82 and an elongated right side beam 84. The beams 82 and 84 are separated by a transverse distance which is less than the transverse distance between the floatation members 222 and 224 of a pontoon boat to be supported thereby as shown in FIGS. 2 and 3. In this fashion, the pontoon boat is supported by the resting engagement of the underside of its deck 210 with the left and right side beams 82 and 84. It will be appreciated that upper frames 80 of different shapes and dimensions may be necessary to accommodate boats of different sizes and types (e.g., a pontoon boat versus a v-hull).

Figure 4:
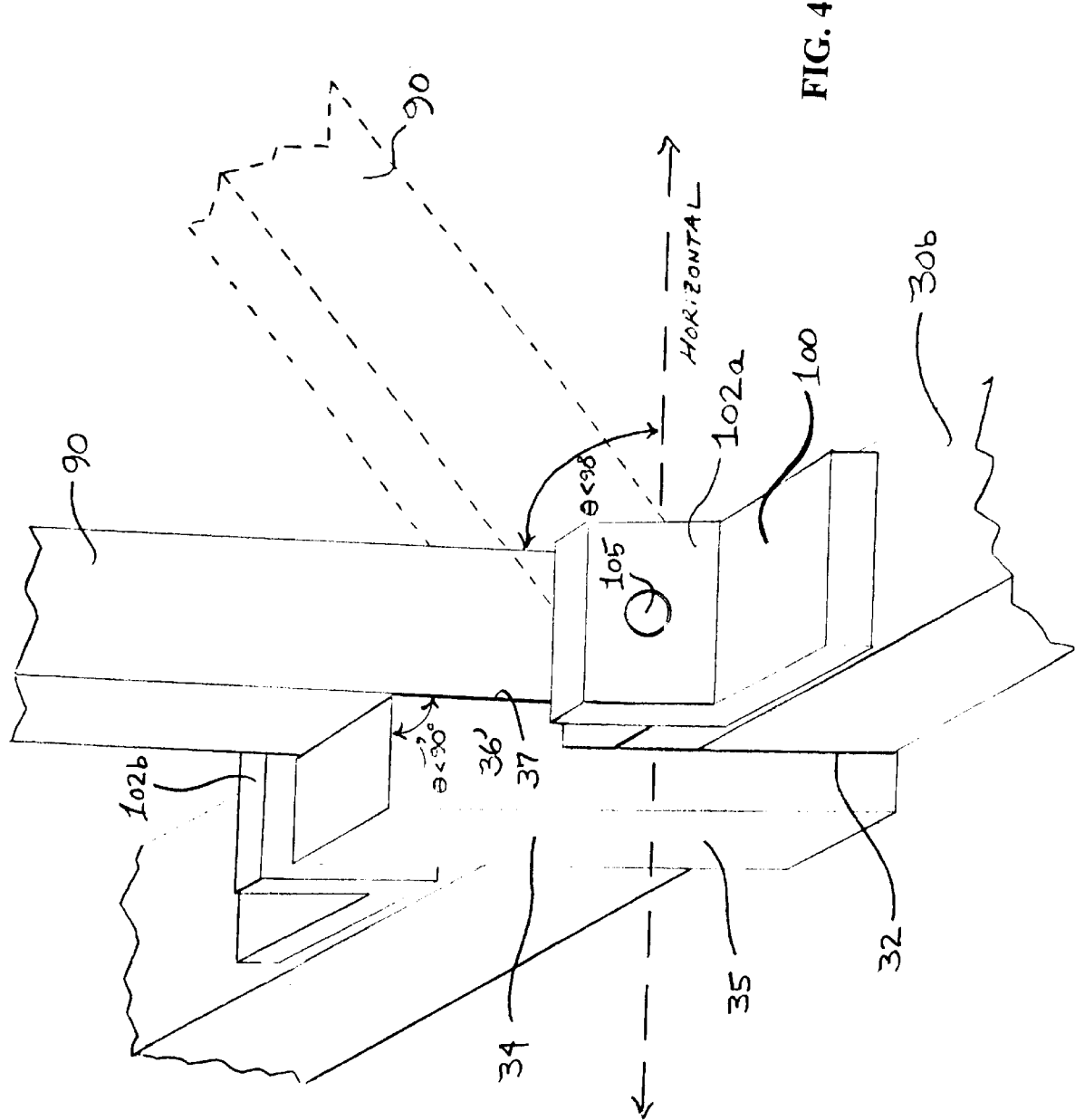
FIG. 4 is a detail showing a pivot bracket and arm stop secured to a transverse frame member of the base frame.

The upper frame 80 is raised and lowered relative to the base frame 20 on a plurality of spaced elongated coupling arms 90. Each coupling arm 90 has opposed first and second ends 92 and 94. The first end 92 of each coupling arm 90 is pivotally connected to the base frame 20, preferably on one of the transverse frame members 30a,b,c and d, by means of a pivot bracket 100. In similar fashion, the second end 94 of each coupling arm 90 is pivotally connected to the upper frame 80. In the configuration illustrated, each bottom pivot bracket includes a pair of spaced anchor plates 102a and 102b anchored to the base frame 100 by welded seams 32 or, alternatively, by screws, bolts and nuts, or rivets, for example. Situated between the anchor plates 102a and 102b is the first end 92 of a coupling arm 90. A pivot pin 105 passes through aligned holes in the first end 92 in the coupling arm 90 and the anchor plates 102a and 102b so that the coupling arm 90 is free to rotate about the pivot pin 105. The pivot pin 105 may be in the form of a bolt and have a nut threadably secured thereto, for example. A detail of a bottom pivot bracket 100 is shown in FIG. 4. The upper pivot brackets 100 in the embodiment illustrated include spaced anchor plates 102a and 102b anchored to either side of each beam 82 and 84.

To maintain the left and right side beams 82 and 84 at an even height with respect to one another and relative to the base frame 20, and to ensure that they move vertically and longitudinally in tandem, cross members 96 are secured at opposed ends thereof to either of the left and right side beams 82 and 84 of the upper frame 80, in which case they form a part of the upper frame 80, or to a pair of transversely spaced coupling arms 90, one of which coupling arms 90 is pivotally connected to the left side beam 82 and the other of which is pivotally connected to the right side beam 84, or to both the beams 82 and 84 and the coupling arms 90, for example. Alternatively, where cross members 96 are secured to the beams 82 and 84, the second ends 94 of both of each pair of transversely spaced coupling arms 90 may be pivotally attached to one such cross member 96. When the base frame 20 and the upper frame 80 are joined as described by the coupling arms 90, the base frame 20, the upper frame 80 and the coupling arms 90 generally form a parallelogram configuration as viewed from either side and as shown in FIG. 1. Furthermore, the upper frame 80 is longitudinally and vertically displaceable with respect to the base frame 20 such that rearward longitudinal motion moves the upper frame 80 toward its extreme lowered position and forward longitudinal motion moves it toward its extreme raised position.

To raise and lower the upper frame 80 on the base frame 20, a winch and cable assembly 150 is provided. Specifically, there is secured to the base frame 20, toward its forward end 22 and centered on the longitudinal axis thereof, an upwardly projecting winch post 152. Attached to the winch post 152 is a winch 154 having a drum 156 therein around and from which a cable 160 is wound and unwound. The cable 160 has a first end (not shown) secured to the drum 156 and a remote end 162. The remote end 162 has attached thereto a hook member 164 which is selectively coupleable to a hookable element 166 (ex: an eye-bolt or U-bolt) fastened to the forwardmost transverse frame member 30a secured between either the beams 82 and 84 or, as in the case illustrated, the forwardmost pair of transversely spaced coupling arms 90. The drum 156 may be rotated by an electric motor powered by an automobile battery 170, as is shown in the drawings, or manually by a hand crank (not shown) to wind the cable 160. Naturally, the winch 154 may be alternatively situated on the upper frame 80 instead, and joined by the cable 160 to the base frame 20 for drawing the upper frame 80 forward toward its raised position. Furthermore, the winch 154 may be mounted to one of the upper frame 80 and base frame 20, the cable "joined" to the other of the upper frame 80 and base frame 20 through a pulley, for example, and the hook member 164 at the remote end 162 of the cable 160 "doubled back" and hooked to the one of the upper frame 80 and base frame 20 that the winch 154 is mounted to. In the end, what is desired is that the winch 154 be mounted on either the upper frame 80, the base frame 20 or some third structure (e.g., a towing vehicle, dock, pile or the boat 200), and the cable 160 arranged such that the winch 154 can draw the upper frame 80 at least forward toward its extreme raised position from a more rearward and lower position; it is not material what arrangement of winch 154 and cable 160 is implemented to accomplish this objective.

Optionally, the coupling arms 90 may be prevented from attaining perpendicularity with the horizontal so that gravity can be relied upon to draw the upper frame 80 toward its extreme lowered position when desired. In one embodiment, this is achieved by one or more arm stops 34 like that shown in the detail of FIG. 4. The arm stop 34 in FIG. 4 includes a vertically oriented stem portion 35 secured to the front side of the transverse frame member 30b preferably by a welded seam 32. At the upper end of the stem portion 35 is a rearwardly extending stop block 36 having a contact face 37 pitched at an acute angle with respect to the horizontal. The contact face 37 is designed to contact the coupling arm 90 and, because of the acute angle at which the contact face is pitched, prevent the coupling arm from attaining perpendicularity with the horizontal. That is, when the upper frame 80 is drawn by the cable 160 to its most forward position, the coupling arms 90 are at an acute angle (i.e., θ<90°) with respect to the horizontal. It will be appreciated that numerous alternative devices may serve as an arm stop 34 to prevent the coupling arms 90 from achieving perpendicularity including, for example, a transverse member mounted to either or both of the upper frame 80 and the base frame 20 and disposed in the path of one of more coupling arms 90 and/or a length of chain, rope, or cable that arrests the coupling arms 90. Even when gravity is relied upon to move the upper frame 80 toward its extreme lowered position, the winch 154 may be used to provide resistance to control the rate at which the upper frame 80 is lowered. That is, the winch 154 may serve as a braking mechanism as is commonly known.

To enhance the stability with which the pontoon boat is retained on the combination trailer and boat lift 15 for towing behind a vehicle and on-land storage, left and right side pontoon cradles 130 and 132 are provided. The left side cradle 130 is not shown in FIG. 1 to avoid obstructing the illustration, but does appear in FIGS. 2 and 3. The pontoon cradles 130 and 132 in the embodiment shown in the figures are each in the form of a pair of longitudinally extending truss members 134 having upper surfaces 136. The truss members 134 of each pair are secured one each to one of the opposed interior surfaces of each of a plurality of longitudinally spaced V-shaped anchor members 140 secured to each side of the base frame 20 such that their upper surfaces 136 are pitched toward one another to form V-shaped pontoon cradles 130 and 132. Ideally, the transverse distance between the vertices of the V-shaped anchor members 140 on opposite sides of the base frame 20 are substantially equal to the transverse distance between the center-axes of the floatation members 222 and 224 of the pontoon boat 200 so that the floatation members 222 and 224 rest flush against each of the upper surfaces 136 of the truss members 134.

It is desirable that the combination boat trailer and lift 15 be lightweight and strong. Accordingly, it may be constructed primarily of channel aluminum and/or I-beam aluminum girders. If constructed primarily of channel aluminum, it is preferred that the channel aluminum be of rectangular or square cross section.

USE AND OPERATION

An embodiment of a combination boat trailer and lift 15 may be used in one or more of the following ways.

With the upper frame 80 at or near its extreme lowered position, the floatation members 222 and 224 resting in the pontoon cradles 130 and 132, and the pontoon boat 200 detachably strapped down or otherwise secured to the combination boat trailer and lift 15, the combination boat trailer and lift 15 is backed down a boat launch ramp into a body of water from the land. It is preferable that the combination boat trailer and lift 15 be backed down the ramp to a point in which the floatation members 222 and 224 are partially submerged. The combination boat trailer and lift 15 is then unhitched from the vehicle hitch and, if not already floating, is pushed further into the water until it "floats" by virtue of its being strapped to the floating pontoon boat 200.

Once the pontoon boat 200 is floating with the combination boat trailer and lift 15 floatably supported under it by support straps (not shown), the pontoon boat's motor may be started and the pontoon boat 200 and combination boat trailer and lift 15 floatably maneuvered about the body of water to a suitable docking location. Once in place at the desired docking location, the support leg 62 of each jack stand 60 is lowered until it contacts the floor of the body of water or other surface upon which it will rest and support the base frame 20. The set screw 70 is then threaded into the bracket 64 until it engages the support leg 62 and can hold it securely in place against the load it will bear. This operation is performed on each jack stand 60 in turn. Optionally, it is suggested that the combination boat trailer and lift 15 then be tied, chained or otherwise detachably secured to a fixed structure such as a dock or mooring to prevent substantial movement.

At this stage, the combination boat trailer and lift 15 has been set in place where it may remain for the duration of the boating season. For storage of the boat 200 above the water during the boating season, the upper frame 80 is then pulled by the winding of the cable 162 around the rotating drum 156 of the winch 154 in the manner discussed previously and the boat is raised on the upper frame 80 as the upper frame 80 moves toward its extreme raised position. When it is desired to use the boat, the cable 162 is permitted to unwind from the drum 156. As the cable 162 unwinds, the upper frame 80 will move toward its extreme lowered position under the force of gravity to a point in which the pontoon boat 200 will begin to float. The motor of the pontoon boat 200 may then be started and put in reverse to power the pontoon boat 200 off and away from the upper frame 80.

To return the pontoon boat 200 onto the upper frame 80 for storage, the upper frame 80 should be in or near its extreme lowered position. The pontoon boat 200 is powered onto the upper frame 80 in the reverse operation in which it was powered off. Once the pontoon boat 200 is properly positioned on the upper frame 80, the cable 162 is wound onto the drum 156 of the winch 154 to raise the upper frame 80 toward its extreme raised position in which the pontoon boat 200 is lifted above the surface of the body of water. To ensure that the pontoon boat 200 is not brought too far forward on the upper frame 80, a boat stop 89 may be secured to the front end of the upper frame 80 to arrest the forward motion of the boat 200 as it is powered onto the upper frame 80. In the embodiment of FIG. 1, the boat stop 89 is in the form of a vertically extending post of metal welded to the front end of the right side beam 84. Although only one boat stop 89 is shown in FIG. 1, where the boat stop 89 is of the form described, it is desirable that there be a similar boat stop 89 on the front end of left side beam 82 as well.

To remove the combination boat trailer and lift 15 from the water at the end of the boating season for land storage, the upper frame 80 is lowered to a point at or near its extreme lowered position, and the pontoon boat 200 is strapped, or otherwise secured, to the combination boat trailer and lift 15 as previously described. The upper frame 80 and base frame 20 should be secured with respect to one another such that the base frame 20 does not extend down into the water (i.e., "dangle") in a position corresponding to the extreme raised position of the upper frame 20 as the boat 200 and combination boat trailer and lift 15 are floatably maneuvered about the body of water. Next, on each jack stand 60, the set screw 70 is loosened and the support leg 62 removed or slid up into a raised position so that its foot 68 is above the bottom of the tires 44a and 44b. When the support leg 62 is so raised, the set screw 70 is again tightened to hold the support leg 62 in place. The combination boat trailer and lift 15 is now floatably supported under the pontoon boat 200 and can be maneuvered about the body of water to a boat launch ramp where it is hitched to a towing vehicle and towed out of the water.

The foregoing is considered to be illustrative of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention as expressed in the appended claims.

What is claimed is:

1. A combination boat trailer and lift comprising:
    an elongated base frame having forward and rear ends, a hitch assembly at its forward end and an axle and wheel assembly to enable towing of the combination boat trailer and lift behind a vehicle over land;
    an elongated, collapsible upper frame for supporting a boat, the upper frame having front and back ends and being cooperatively coupled to the base frame by a plurality of spaced apart elongated coupling arms, each coupling arm having opposite first and second ends and being pivotally attached at one end to the base frame and at its opposite end to the upper frame, the upper frame being longitudinally and vertically displaceable with respect to the base frame in a pivotal mode on the coupling arms between an extreme lowered position and an extreme raised position such that forward displacement raises the upper frame and rearward displacement lowers the upper frame;
    a winch secured to one of the of (i) the base frame, (ii) the upper frame and (iii) a third structure and including a cable arrangeable such that the winch can draw the upper frame at least forward toward its extreme raised position from a more rearward and lower position; and
    a plurality of downwardly extending support legs for supporting the base frame above the floor of a body of water, each support leg being adjustable so as to facilitate changes in the distance to which the leg extends downwardly from the base frame.

2. The combination boat trailer and lift of claim 1 wherein each support leg is adjustable and selectively securable into different positions independently of the other legs so that the base frame may be supported substantially level over uneven terrain.

3. The combination boat trailer and lift of claim 1 wherein the axle and wheel assembly is at least one of (i) removable and (ii) waterproof.

4. The combination boat trailer and lift of claim 1 further including an arm stop secured to at least one of the base frame, the upper frame and a coupling arm to prevent the coupling arms from achieving perpendicularity so that gravity may be relied upon to lower the upper frame toward its extreme lowered position.

5. The combination boat trailer and lift of claim 1 wherein the upper frame is adapted for supporting at least one of (i) a pontoon boat and (ii) a catamaran boat, the boat having left and right side floatation members separated by a transverse distance and a deck mounted to and extending transversely between the floatation members, the upper frame of the combination boat trailer and lift including longitudinally extending left and right side beams, the beams being transversely separated by a distance that is less than the distance by which the floatation members are separated such that the boat can be supported by the resting engagement of the underside of the boat's deck upon the left and right side beams.

6. The combination boat trailer and lift of claim 5 wherein the base frame includes left and right side pontoon cradles transversely spaced such that, when the upper frame is in the extreme lowered position, the floatation members of the boat rest in the pontoon cradles.

7. The combination boat trailer and lift of claim 6 further including an arm stop secured to at least one of the base frame, the upper frame and a coupling arm to prevent the coupling arms from achieving perpendicularity so that gravity may be relied upon to lower the upper frame toward its extreme lowered position.

8. The combination boat trailer and lift of claim 1 wherein the upper frame is adapted for supporting and lifting a V-hulled boat.

9. The combination boat trailer and lift of claim 8 further including an arm stop secured to at least one of the base frame, the upper frame and a coupling arm to prevent the coupling arms from achieving perpendicularity so that gravity may be relied upon to lower the upper frame toward its extreme lowered position.

10. A combination boat trailer and lift adapted for towing and lifting at least one of (i) a pontoon boat and (ii) a catamaran boat, the boat having left and right side floatation members separated by a transverse distance and a deck mounted to and extending between the floatation members, the combination boat trailer and lift comprising comprising:
    an elongated base frame having forward and rear ends, a hitch assembly at its forward end and an axle and wheel assembly to enable towing of the combination boat trailer and lift behind a vehicle over land;
    an elongated, collapsible upper frame having front and back ends, the upper frame being cooperatively coupled to the base frame by a plurality of spaced apart elongated coupling arms, each coupling arm having opposite first and second ends and being pivotally attached at one end to the base frame and at its opposite end to the upper frame, the upper frame being longitudinally and vertically displaceable with respect to the base frame in a pivotal mode on the coupling arms between an extreme lowered position and an extreme raised position such that forward displacement raises the upper frame and rearward displacement lowers the upper frame, the upper frame further including longitudinally extending left and right side beams, the beams being transversely separated by a distance that is less than the distance by which the floatation members are separated such that the boat can be supported by the resting engagement of the underside of the boat's deck upon the left and right side beams;
    a winch secured to one of the of (i) the base frame, (ii) the upper frame and (iii) a third structure and including a cable arrangeable such that the winch can draw the upper frame at least forward toward its extreme raised position from a more rearward and lower position;
    a plurality of downwardly extending support legs for supporting the base frame above the floor of a body of water, each support leg being adjustable so as to facilitate changes in the distance to which the leg extends downwardly from the base frame.

11. The combination boat trailer and lift of claim 10 further including an arm stop secured to at least one of the base frame, the upper frame and a coupling arm to prevent the coupling arms from achieving perpendicularity so that gravity may be relied upon to lower the upper frame toward its extreme lowered position.

12. The combination boat trailer and lift of claim 10 wherein the axle and wheel assembly is at least one of (i) removable and (ii) waterproof.

13. The combination boat trailer and lift of claim 10 wherein each support leg is adjustable and selectively securable into different positions independently of the other legs so that the base frame may be supported substantially level over uneven terrain.

14. The combination boat trailer and lift of claim 10 wherein the base frame includes left and right side pontoon cradles transversely spaced such that, when the upper frame is in the extreme lowered position, the floatation members of the boat rest in the pontoon cradles.

15. A combination boat trailer and lift comprising:

an elongated base frame having forward and rear ends, a hitch assembly at its forward end and an axle and wheel assembly to enable towing of the combination boat trailer and lift behind a vehicle over land;

an elongated, collapsible upper frame for supporting a boat, the upper frame having front and back ends and being cooperatively coupled to the base frame by a plurality of spaced apart elongated coupling arms, each coupling arm having opposite first and second ends and being pivotally attached at one end to the base frame and at its opposite end to the upper frame, the upper frame being longitudinally and vertically displaceable with respect to the base frame in a pivotal mode on the coupling arms between an extreme lowered position and an extreme raised position such that forward displacement raises the upper frame and rearward displacement lowers the upper frame;

a winch secured to one of the of (i) the base frame, (ii) the upper frame and (iii) a third structure and including a cable arrangeable such that the winch can draw the upper frame at least forward toward its extreme raised position from a more rearward and lower position; and a plurality of downwardly extending support legs for supporting the base frame above the floor of a body of water, each support leg being adjustable so as to facilitate changes in the distance to which the leg extends downwardly from the base frame, the support legs being securable into different positions independently of one another so that the base frame can be supported substantially evenly over uneven terrain and the base frame supported over the floor of the body of water such that the extreme raised position of the upper frame corresponds to a boat being supported thereby being raised above the surface of the body of water and at least one position lower than the extreme raised position enables the boat to one of (i) float free of the upper frame and (ii) floatably maneuver the combination boat trailer and lift about the body of water.

16. The combination boat trailer and lift of claim 15 wherein the upper frame is adapted for supporting at least one of (i) a pontoon boat and (ii) a catamaran boat, the boat having left and right side floatation members separated by a transverse distance and a deck mounted to and extending transversely between the floatation members, the upper frame of the combination boat trailer and lift including longitudinally extending left and right side beams, the beams being transversely separated by a distance that is less than the distance by which the floatation members are separated such that the boat can be supported by the resting engagement of the underside of the boat's deck upon the left and right side beams.

17. The combination boat trailer and lift of claim 16 wherein the base frame includes left and right side pontoon cradles transversely spaced such that, when the upper frame is in the extreme lowered position, the floatation members of the boat rest in the pontoon cradles.

\* \* \* \* \*